(12) United States Patent
Kim

(10) Patent No.: US 9,165,037 B2
(45) Date of Patent: Oct. 20, 2015

(54) APPARATUS AND METHOD FOR ANALYZING USER PREFERENCE ABOUT DOMAIN USING MULTI-DIMENSIONAL, MULTI-LAYERED CONTEXT STRUCTURE

(75) Inventor: Jun-Hyeong Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/425,296

(22) Filed: Mar. 20, 2012

(65) Prior Publication Data

US 2013/0091158 A1    Apr. 11, 2013

(30) Foreign Application Priority Data

Oct. 5, 2011  (KR) .................. 10-2011-0101349

(51) Int. Cl.
 *G06F 17/30* (2006.01)
(52) U.S. Cl.
 CPC ............................. *G06F 17/30522* (2013.01)
(58) Field of Classification Search
 None
 See application file for complete search history.

(56) References Cited

U.S. PATENT DOCUMENTS

| | | | |
|---|---|---|---|
| 6,697,842 B1 * | 2/2004 | Smith et al. | 709/206 |
| 7,433,885 B2 | 10/2008 | Jones | |
| 7,720,844 B2 * | 5/2010 | Chu et al. | 707/724 |
| 8,600,981 B1 * | 12/2013 | Chau et al. | 707/723 |
| 2006/0229802 A1 * | 10/2006 | Vertelney et al. | 701/200 |
| 2009/0018996 A1 * | 1/2009 | Hunt et al. | 707/2 |
| 2009/0171939 A1 * | 7/2009 | Athsani et al. | 707/5 |
| 2010/0131265 A1 * | 5/2010 | Liu et al. | 704/9 |
| 2010/0185605 A1 * | 7/2010 | Chu et al. | 707/722 |
| 2010/0299319 A1 | 11/2010 | Parson et al. | |
| 2010/0331016 A1 * | 12/2010 | Dutton et al. | 455/456.3 |
| 2011/0137927 A1 * | 6/2011 | Partridge et al. | 707/767 |
| 2011/0238379 A1 * | 9/2011 | Misra et al. | 702/187 |
| 2011/0302130 A1 * | 12/2011 | Lee et al. | 707/602 |
| 2012/0072096 A1 * | 3/2012 | Chapman et al. | 701/118 |
| 2012/0083285 A1 * | 4/2012 | Shatsky et al. | 455/456.1 |
| 2012/0109751 A1 * | 5/2012 | Binenstock et al. | 705/14.58 |
| 2012/0117015 A1 * | 5/2012 | Sathish | 706/47 |
| 2012/0150874 A1 * | 6/2012 | Sweeney et al. | 707/749 |
| 2012/0158516 A1 * | 6/2012 | Wooten et al. | 705/14.66 |
| 2012/0203639 A1 * | 8/2012 | Webster et al. | 705/14.66 |
| 2012/0233158 A1 * | 9/2012 | Braginsky et al. | 707/724 |
| 2012/0239646 A1 * | 9/2012 | Bailey et al. | 707/733 |
| 2013/0018907 A1 * | 1/2013 | Kuhn et al. | 707/758 |

FOREIGN PATENT DOCUMENTS

| | | |
|---|---|---|
| JP | 4691107 B2 | 6/2011 |
| KR | 10-2010-0047646 A | 5/2010 |
| KR | 10-2010-0052491 A | 5/2010 |
| WO | WO 2006/048046 A1 | 5/2006 |

OTHER PUBLICATIONS

U.S. Appl. No. 61/507,934, filed Jul. 14, 2011.*

* cited by examiner

*Primary Examiner* — Jay Morrison
(74) *Attorney, Agent, or Firm* — NSIP Law

(57) ABSTRACT

An apparatus of analyzing a user preference about a domain is provided. The apparatus including a context structure creator configured to analyze a history of a context and to create a context structure that expresses a relationship between contexts, and a context structure matching unit configured to match a current context to the context structure and calculate a context matching value of the current context.

18 Claims, 6 Drawing Sheets

FIG. 4

| ID | LEVEL 0 | LEVEL 1 | LEVEL 2 | FREQUENCY |
|----|---------|---------|---------|-----------|
| 1 | WEATHER | FINE WEATHER | CLEAR | 15 |
| 2 | WEATHER | FINE WEATHER | CLOUDY | 5 |
| 3 | WEATHER | BAD WEATHER | YELLOW DUST | 2 |
| 4 | WEATHER | BAD WEATHER | RAIN | 3 |
| 5 | WEATHER | BAD WEATHER | SNOW | 0 |

APPARATUS AND METHOD FOR ANALYZING USER PREFERENCE ABOUT DOMAIN USING MULTI-DIMENSIONAL, MULTI-LAYERED CONTEXT STRUCTURE

CROSS-REFERENCE TO RELATED APPLICATION

This application claims the benefit under 35 U.S.C. §119(a) of a Korean Patent Application No. 10-2011-0101349, filed on Oct. 5, 2011, the entire disclosure of which is incorporated herein by reference for all purposes.

BACKGROUND

1. Field

The following description relates to an apparatus and a method for analyzing user preference about a domain using multi-dimensional, multi-layered context structure.

2. Description of the Related Art

With the development of Internet technologies, some websites analyze users' preferences about specific domains relating to the users' daily lives and provide users with recommendations on the Internet based on the specific domains. Examples of the specific domains include favorite restaurants, call lists, etc. Also, with the development of mobile communication technologies, users' preferences about domain elements may be provided through mobile communication terminals such as smart phones. In general, a user may tend to display a constant pattern about a specific domain according to a peripheral environment. In other words, in response to a specific peripheral environment being provided, a user may have a tendency to select a specific element in a specific domain. Thus, in response to users' preferences about specific domain elements being analyzed or inferred, a peripheral environment has been dealt with independently, or considered in association with other factors only in response to exactly matching a predetermined condition. Thus, accurate analysis results on the users' preferences could not be offered. Independently may refer to without considering a hierarchical structure or a relationship between peripheral environments. For example, in response to outdoor activities being recommended, weather conditions may be classified into a clear weather, a cloudy weather, and a raining weather. Conventionally, if the weather conditions are fine, outdoor activities that generally take place only under clear weather conditions may be recommended. However, many people may enjoy various outdoor activities under cloudy weather conditions. Also, people may show restraint in enjoying outdoor activities when the weather conditions are too cool or too hot even though the weather conditions may be fine. Accordingly, in order to recommend proper outdoor activities according to weather conditions, various peripheral environments such as temperature may be taken into consideration together with a hierarchical relationship such as weather conditions.

SUMMARY

According to an aspect, an apparatus of analyzing a user preference about a domain is provided. The apparatus includes a context structure creator configured to analyze a history of a context and to create a context structure that expresses a relationship between contexts, and a context structure matching unit configured to match a current context to the context structure and calculate a context matching value of the current context.

The apparatus may include a context collector configured to collect the current context and store the current context in a context storage.

The context structure may be created for each element of a domain.

The apparatus may include a domain preference inquiring unit configured to request a controller to send a user preference value about an element of a domain, in response to a request from an application.

The controller may control the context structure matching unit to calculate the context matching value, in response to the request from the domain preference inquiring unit.

The context structure may be in a form of a hypercube, the hypercube multi-dimensionally and multi-layeredly representing a kind of context or two or more kinds of contexts associated with each other.

The context matching value may be calculated by multiplying an occurrence frequency of context by a predetermined weight value.

The predetermined weight value may be a level value of the current context.

The context matching value may be obtained by recursively adding a context matching value of a specific level with a context matching value of a parent level of the specific level.

The context matching value may be calculated in consideration of an occurrence frequency of a case where the context matching value is inaccurate.

The contexts may be expressed numerically.

The contexts may be expressed non-numerically.

The current context may be collected via a sensor, a system service, a user profile, or an Open API.

In another aspect, a method of analyzing a user preference about a domain is provided. The method includes collecting a current context and storing the current context in a context storage, analyzing histories of contexts stored in the context storage and creating a context structure that expresses a relationship between the contexts, matching the current context to the context structure and calculating a context matching value of the current context about a domain element.

The context structure may be in a form of a hypercube, the hypercube multi-dimensionally and multi-layeredly representing a kind of context or two or more kinds of contexts associated with each other.

The context matching value may be calculated by multiplying an occurrence frequency of context by a predetermined weight value.

The predetermined weight value may be a level value of the current context.

The context matching value may be obtained by recursively adding a context matching value of a specific level with a context matching value of a parent level of the specific level.

The context matching value may be calculated in consideration of an occurrence frequency of a case where the context matching value is inaccurate.

In another aspect, a device is provided. The device includes an apparatus of analyzing a user preference about a domain including a context structure creator configured to create a context structure that expresses a relationship between contexts, and a context structure matching unit configured to match a current context to the context structure and calculate a context matching value of a current context.

Other features and aspects may be apparent from the following detailed description, the drawings, and the claims.

BRIEF DESCRIPTION OF THE DRAWINGS

FIG. 4 is a diagram illustrating an example of a context level table for the context structure of FIG. 3.

Figure 1:
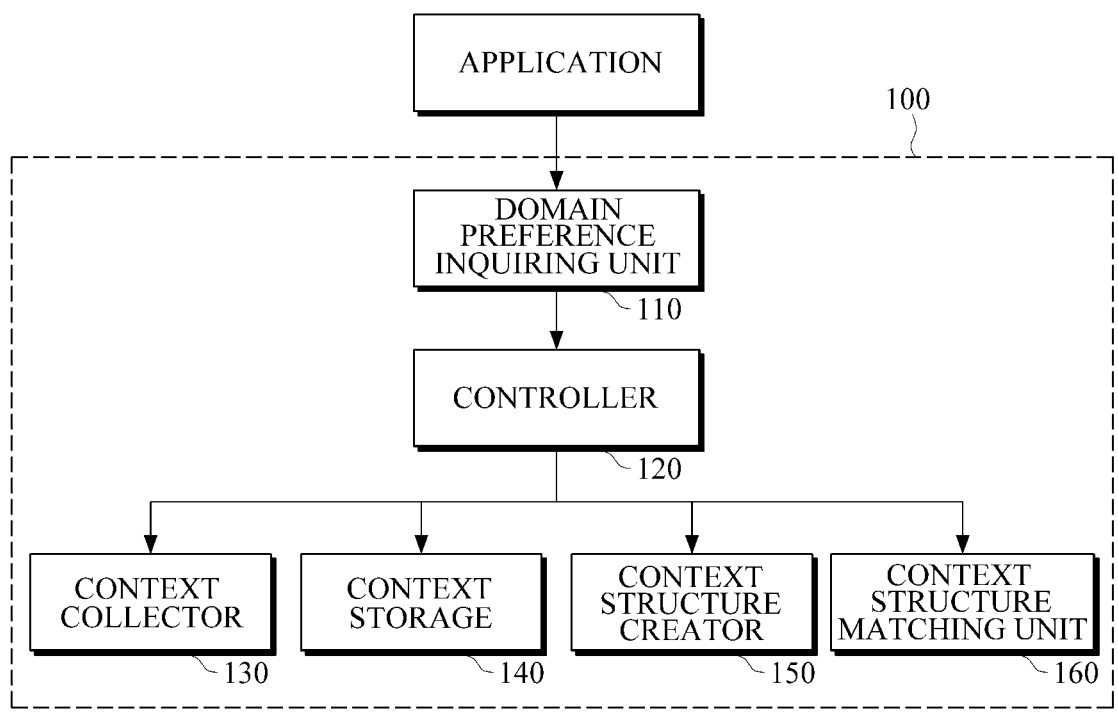
FIG. 1 is a diagram illustrating an example of an apparatus of analyzing a user preference about a domain using a multi-dimensional, multi-layered context structure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of an apparatus 100 that analyzing a user preference about a domain using a multi-dimensional, multi-layered context structure. The apparatus 100 may include a context structure creator 150 and a context structure matching unit 160. The context structure creator 150 may analyze a history of a context and create a context structure expressing a relationship between contexts. The context structure creator 150 may analyze a history of a context periodically and create a context structure to which a latest context has been reflected. The apparatus 100 may further include a context storage 140 for storing the histories of contexts. Collected contexts may be stored in the context storage 140, and the context structure creator 150 may analyze one or more contexts stored in the context storage 140 periodically to thereby create a context structure.

Context may relate to all kinds of information resources that may reflect a user's situation, peripheral environment, etc. For example, all kinds of information resources relating to a user's peripheral environments may include time, place, temperature, a day of the week, heat, cold, clear, cloudy, etc. The information resources may be considered as contexts. Contexts may be expressed hierarchically for each kind and also may be classified into numeric contexts. An example of a numeric context may include temperature that can be represented as a figure, and an example of a non-numeric context may include a place that cannot be represented as a figure. The numeric context may correspond to a numeric range, and the non-numeric context may correspond to a group of specific members. Generally, individual contexts relating to a peripheral environment may have a tendency to not be independent and may be closely associated with each other.

The context structure may be created for an element of a specific domain. The specific domain may be recommended to a user via a website or an application of a smart phone, etc. The specific domain may be set based on various criterion. The various criterion may include, for example, the user's daily lives, favorite restaurants, call lists, etc. The element of the specific domain may refer to a category into which the specific domain is classified. For example, in response to the specific domain being a restaurant, the specific domain may be classified into an element, such as a Korean restaurant, a Chinese restaurant, an American restaurant, a European restaurant, etc. Contexts about a specific element of a specific domain may be variously defined. For example, in response to an element of a specific domain being a Korean restaurant, a place, a time, a day of the week, a weather, etc. relating to when a certain user visits the Korean restaurant, may be considered as contexts. The context structure creator 150 may create a context structure in consideration of a hierarchical structure and relationship between such various kinds of contexts.

The context structure matching unit 160 may match a currently collected context to the context structure created by the context structure creator 150. Thus, the context structure matching unit 160 may calculate a context matching value. Since the context matching value may be calculated using the context structure that is created in consideration of a hierarchical structure and relationship between various contexts, the user's peripheral environment may be more accurately reflected to better infer and predict the user's preference about the specific domain.

According to another aspect, the apparatus 100 may include a context collector 130 for collecting a current context and storing the current context in the context storage 140. The context collector 130 may collect contexts via a sensor, a system service, a user profile, an Open Application Programming Interface (API). The context collector 130 may collect a current context periodically to manage a latest context history. The context structure matching unit 160 may use the current context collected by the context collector 130 in context matching.

According to another aspect, the apparatus 100 may include a domain preference inquiring unit 110 and a controller 120. The domain preference inquiring unit 110 may request the controller 120 to send a user preference value about an element of a domain, when requested by an application. The application may be software that is installed on and executed on the apparatus 100. The application may provide an interface for receiving a request from a user and providing the user with the requested result. The application may be software installed in a mobile terminal such as a smart phone and executed by a user. However the application is not limited to software, and the application may be implemented by hardware.

The domain preference inquiring unit 110 may request the controller 120 to send a user preference value in response to receiving an inquiry about a user preference on a specific domain from an application. Then, the controller 120 may request the context structure matching unit 160 to calculate and provide a matching value of a current context. Thereafter, the controller 120 may receive the context matching value from the context structure matching unit 160, calculate a user preference value, and provide the user preference value to the domain preference inquiring unit 110. Then, the domain preference inquiring unit 110 may provide the user preference value to the user via the application.

Figure 2:
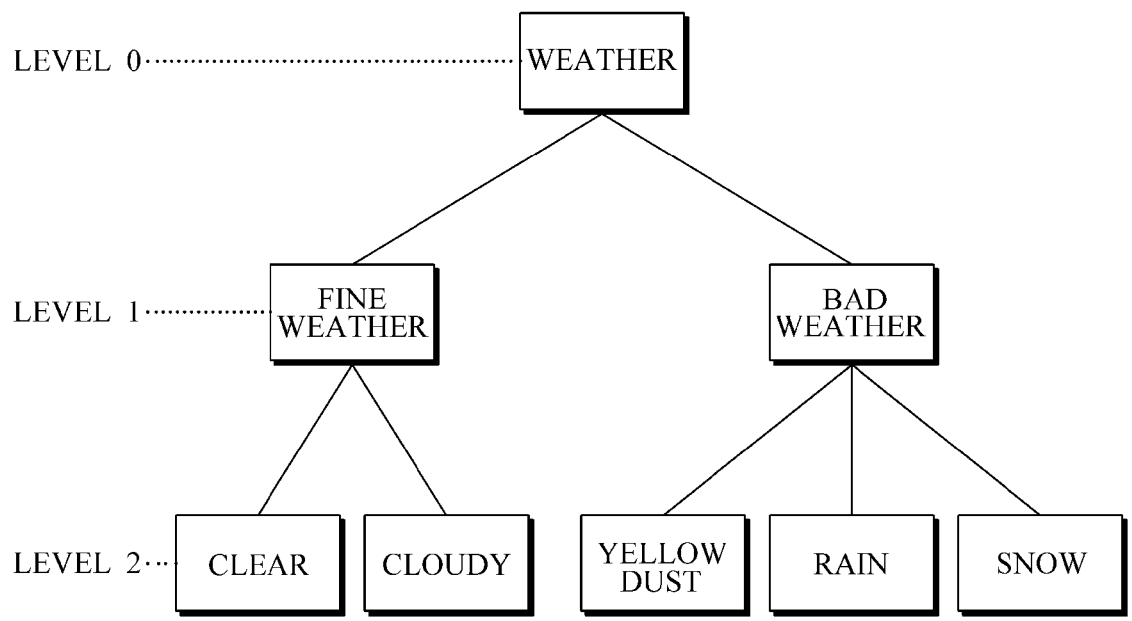
FIG. 2 is a diagram illustrating an example of a context tree which hierarchically expresses a kind of context.

FIG. 2 illustrates an example of a context tree which hierarchically expresses a kind of context. The upper node of the context tree may include the concepts and ranges of the lower nodes. For example, "Fine Weather" of a level 1 may be interpreted to include all weather conditions suitable for outdoor activities. The suitable weather conditions may include clear weather and cloudy weather.

Figure 3:
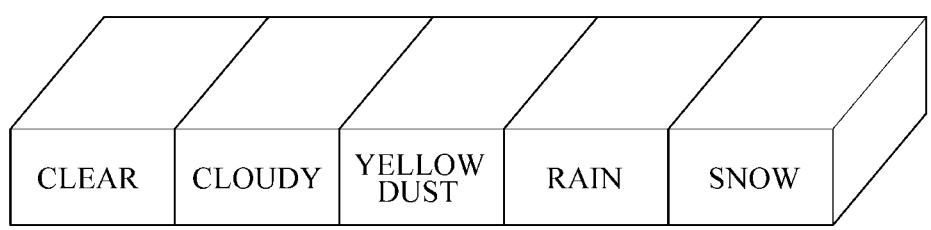
FIG. 3 is a diagram illustrating an example of a context structure about a kind of context.

FIG. 3 illustrates an example of a context structure about a kind of context. The kind of context may be weather. Each cell of the context structure may correspond to a leaf context of a context tree and each cell may have an occurrence frequency as its attribute value.

FIG. 4 illustrates an example of a context level table for the context structure of FIG. 3. The context level table may be used to calculate a context matching value for a kind of context.

Multiplying an occurrence frequency of the context by a predetermined weight value may return as a result a context matching value of a current context. The predetermined weight value may be used to allocate a predetermined score to a context. The context may be used for accurately calculating a user preference value relating to the corresponding domain. The predetermined weight value may correspond with a level value of each node. In other words, upon calculating a context matching value of a current context, a greater weight value may be allocated to the current context in response to the current context being substantially similar to a context of the lower node. Accordingly, accuracy may be improved.

Also, recursively adding a context matching value of a specific level with a matching value of a parent level of the specific level may result in a context matching value of a current context. In response to a context matching value of a current context being calculated, the case where no context that substantially corresponds to the current context existing in the context structure may occur. In this case, the context matching value of the current context may be obtained by adding a matching value of a parent node, then obtaining a matching value of the parent node, and recursively adding the matching values.

A method of calculating a context matching value using a context structure as shown in FIG. 3 and a context level table as shown in FIG. 4 may be expressed by equation 1 below. In equation 1, ContextStructure(D, E) may relate to a context structure created for an element E of a domain D, and CurrentContext(C) may relate to a current value of a context C. The current value may correspond to $C_i$. In response to a current context to be matched corresponding to $C_i$, a level value of $C_i$ may be multiplied by an occurrence frequency of $C_i$. The result of the multiplication may be added to a product of a level value and an occurrence frequency of a parent node. This process may be recursively repeated.

$$\begin{aligned} \text{Matching}(C_i) &= \text{Matching}(ContextStructure(D, E), CurrentContext(C)) \quad (1) \\ &= \text{Weight}(C_i) \times freq(C_i) + \text{Matching}(Parent(C_i)) \\ &= \text{Weight}(C_i) \times freq(C_i) + \\ &\quad \text{Weight}(Parent(C_i)) \times freq(Parent(C_i)) + \ldots \end{aligned}$$

For example, in response to the context level table shown in FIG. 4 being a context level table for an element E of a domain D, a matching value for a context "clear weather" may become "50" by adding a product "30" resulting from a level value "2" of a context "clear" multiplied by its occurrence frequency "15" with a product "20" resulting from a level value "1" of the parent-level context "fine weather" multiplied by its occurrence frequency "20" (in other words, its occurrence frequency is the addition of "15" of ID 1 and "5" of ID 2).

Figure 5:
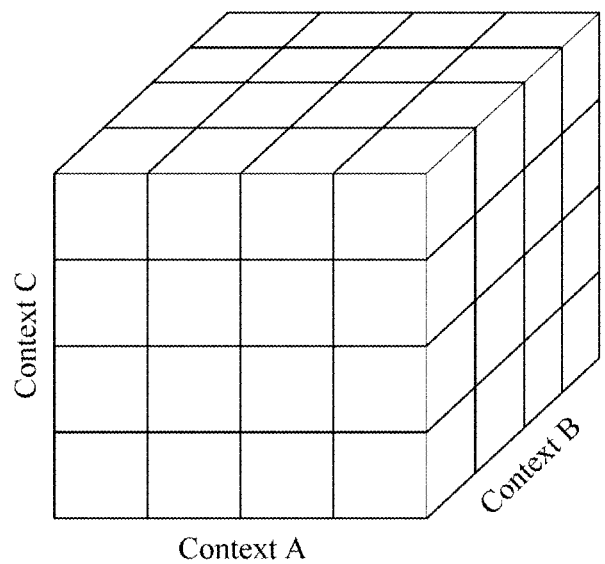
FIG. 5 is a diagram illustrating an example of a context structure in the form of a hypercube.

FIG. 5 illustrates an example of a context structure in the form of a hypercube. Referring to FIG. 5, a method of calculating a context matching value using a context structure in the form of a hypercube is described below. The context structure in the form of a hypercube may be created by multi-dimensionally and multi-layeredly expressing different kinds of contexts associated with each other. A context structure may correspond to a domain element, and an axis of the context structure may correspond to one context. Also, values on each axis may correspond to leaf contexts of a context tree. Each cell of a context structure may correspond to a group of various contexts configuring a specific peripheral environment. In other words, the context structure may be in the form of a hypercube. An attribute value of each cell may correspond with an occurrence frequency. In order to calculate a matching value of a context group using a context structure in the form of a hypercube, a hierarchical structure for each axis (one context) may have to be given. The hierarchical structure for each axis may be included in an attribute value of each cell, or a context level table as shown in FIG. 4 may be created and managed.

With reference to FIG. 3, a matching value of a context structure may be calculated by multiplying an occurrence frequency of a context with a predetermined weight value. In this example, the predetermined weight value may correspond with a level value of the context. One of the reasons for multiplying a level value of a context as a weight value may be to improve accuracy by allocating a higher score to the matching values of leaf contexts. Also, in response to an accurate matching value of an input context not being found, the accurate matching value of the input context may be obtained by recursively adding a matching value of a to specific level with a matching value of a parent level of the specific level.

An equation for calculating a matching value of a context group using a context structure in the form of a hypercube as illustrated in FIG. 5 may be defined as equation 2 below. Equation 2 may be an example of a calculation of a matching value of a current context group $C_a, C_b, C_c, \ldots$ with respect to a context structure for an element $D_\alpha$ of a domain D. In other words, based on equation 2, a matching value (level value times occurrence frequency) of a current level context may be recursively added with a matching value of its parent context. The meaning of "recursively adding" may refer to a method of repeatedly adding a matching value of a parent level context with a matching value of its parent level. Also, the matching value of the current level context may be calculated in consideration of all occurrence frequencies from the case where one of N contexts is inaccurate to the case where N−1 ones of the N contexts are inaccurate. Including the case where a context is inaccurate in calculating a matching value may be aimed at making a matching value of in response to a context being accurate greater than a matching value of in response to a context being inaccurate.

$$\begin{aligned} \text{Matching}(ContextStructure(D_a)), CurrentContextSet) &= \quad (2) \\ \text{Matching}(C_a, C_b, C_c \ldots) &= \text{Weight}(C_a) \times freq(C_a, C_b, C_c \ldots) + \\ \text{Weight}'(C_a) &\times \sum_{C_x} freq(\ldots C_{x,p} \ldots) + \\ \text{Weight}'(C_a) &\times \sum_{C_x,C_y} freq(\ldots C_{x,p}, C_{y,p} \ldots) + \\ &\ldots + \text{Matching}(C_{a,p}, C_{b,p}, C_{c,p} \ldots) \end{aligned}$$

An equation for obtaining a domain element most preferred by a user in response to a context and a domain being given may relate to equation 3 below. A domain element most preferred by a user may be a domain element at which a matching value of a current context with respect to a context structure for the domain element reaches a maximum value.

$$Preference(D_\alpha) = \qquad (3)$$
$$Matching(ContextStructure(D_\alpha), CurrentContextSet)$$
$$D_{most\_preferred} = \underset{D_\alpha \in Domain}{argmax}(Preference(D_\alpha))$$

Figure 6:
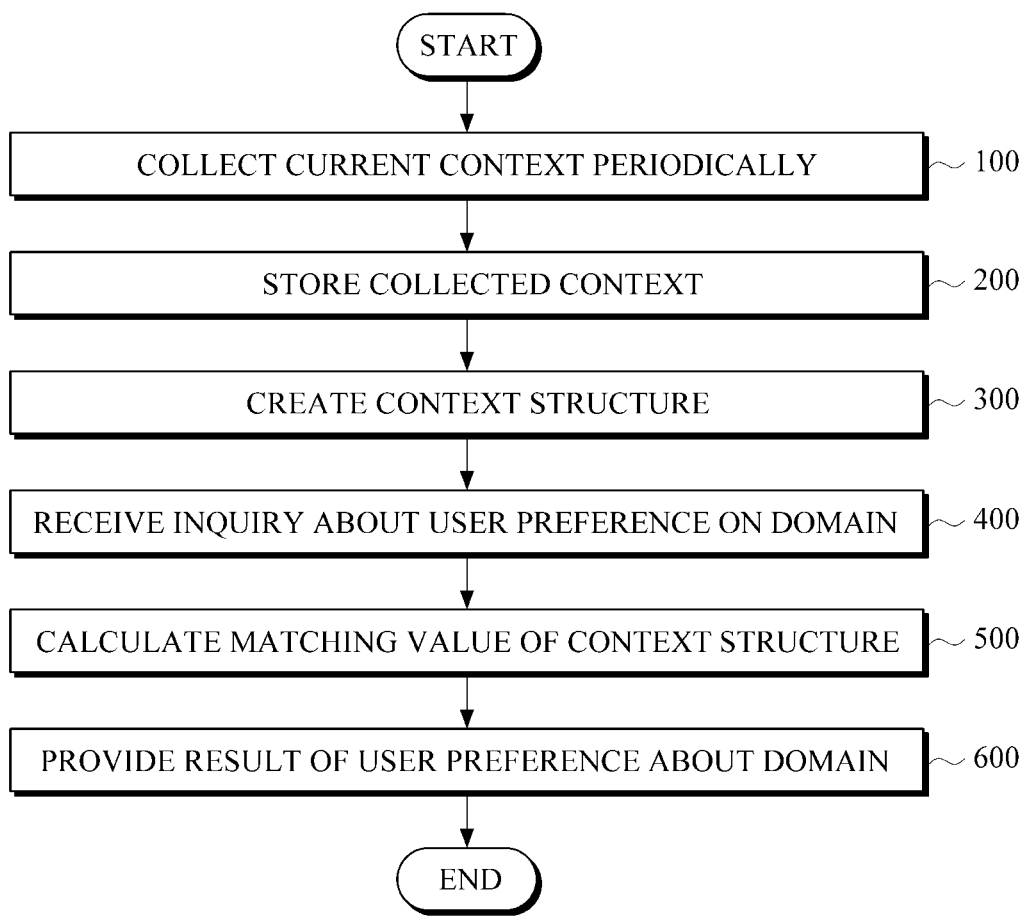
FIG. 6 is a flowchart illustrating an example of a method of analyzing a user preference about a domain using a multi-dimensional, multi-layered context structure.

FIG. 6 illustrates an example of a method of analyzing a user preference about a domain using a multi-dimensional, multi-layered context structure.

Referring to FIGS. 1 and 6, a current context may be collected (100). The current context may be collected via a sensor, a system service, a user profile, or an Open API. The current context may be used for matching to a context structure. The operation 100 of collecting contexts may be performed periodically or in response to a request from an application. The collected context may be stored in the context storage 140 (200). Accordingly, the history of the context may be managed.

The histories of contexts stored in the context storage 140 may be analyzed to create a context structure representing a relationship between the contexts (300). The context structure may be created in consideration of the hierarchical structure or relationship between the contexts stored in the context storage 140. The context structure may be created periodically so that a latest collected context may be included in the context structure. The context structure may be in the form of a hypercube. The hypercube may multi-dimensionally and multi-layeredly represent a kind of context or two or more kinds of contexts associated with each other. As discussed above, FIG. 3 shows a context structure for a kind of context, and FIG. 5 shows a context structure in the form of a hypercube. A concept of expanding a context structure for a kind of context to various kinds of contexts may be a context structure in the form of a hypercube.

A user preference value may be requested from the application (400). The domain preference inquiring unit 110 may request the controller 120 to send a user preference value for an element of a domain, in response to the request from the application. Then, the controller 120 may request the context structure matching unit 160 to calculate and provide a matching value of the current context. The controller 120 may calculate a user preference value and provide the user preference value to the domain preference inquiring unit 110 in response to receiving a context matching value from the context structure matching unit 160. The domain preference inquiring unit 110 may provide the user preference value to the user through the application.

Then, the current context may be matched to the created context structure. Upon the current context being matched to the created context structure, a matching value of the context structure about the domain element may be calculated (500). The matching value of the context structure may be calculated by multiplying an occurrence frequency of the context with a predetermined weight value. In this example, the predetermined weight value may correspond with a level value of the context. The reason of multiplying a level value by a weight value is to improve accuracy. The improvement in the accuracy occurs because a higher score may be allocated to matching values of leaf contexts. In order to calculate an accurate matching value in response to an accurate matching value for a context not being found, a method of recursively adding a matching value of a specific level with a matching value of its parent level may be used. The meaning of "recursively adding" may correspond to obtaining a matching value of a parent level to add a matching value of a parent level of the specific level.

Thereafter, in response to the application requesting provision of a domain element preferred by the user for the current context and domain, a domain element having a maximum value among matching values for individual elements of domains may be provided as a domain element most preferred by the user (600).

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus of analyzing a user preference about a domain element, comprising:
   a context structure creator executing on a hardware processor, the context structure creator being configured to analyze a history of the user's contexts associated with the domain element and to create a context structure in a form of a hypercube that expresses a relationship between the user's contexts; and
   a context structure matching unit configured to match the user's current context to the context structure and to calculate a context matching value of the user's current context,
   wherein the context matching value represents the user preference about the domain element and is calculated in consideration of a frequency of the context matching value being inaccurate by recursively adding a context matching value of a specific level with a context matching value of a parent level of the specific level.

2. The apparatus of claim 1, further comprising a context collector configured to collect the user's current context and to store the user's current context in a context storage.

3. The apparatus of claim 1, wherein the context structure is created for each element of a domain.

4. The apparatus of claim 1, further comprising a domain preference inquiring unit configured to request a controller to send a user preference value about an element of a domain, in response to a request from an application.

5. The apparatus of claim 4, wherein the controller controls the context structure matching unit to calculate the context matching value, in response to the request from the domain preference inquiring unit.

6. The apparatus of claim 1, wherein the hypercube multi-dimensionally and multi-layeredly representing a kind of context or two or more kinds of contexts associated with each other.

7. The apparatus of claim 6, wherein the context matching value is calculated by multiplying an occurrence frequency of context by a predetermined weight value.

8. The apparatus of claim 7, wherein the predetermined weight value is a level value of the current context.

9. The apparatus of claim 1, wherein the context matching value is calculated based on occurrence frequencies of the user's contexts associated with the domain element and the user's current context.

10. The apparatus of claim 1, wherein the contexts are expressed numerically.

11. The apparatus of claim 1, wherein the contexts are expressed non-numerically.

12. The apparatus of claim 1, wherein the current context is collected via a sensor, a system service, a user profile, or an Open API.

13. A method of analyzing a user preference about a domain element, comprising:
   collecting user's contexts associated with the domain element and storing the user's contexts in a context storage;
   analyzing histories of the user's contexts associated with the domain element stored in the context storage and creating a context structure in a form of a hypercube that expresses a relationship between the user's contexts; and
   matching the user's current context to the context structure and calculating a context matching value of the user's current context about the domain element,
   wherein the context matching value represents the user preference about the domain element and is calculated in consideration of a frequency of the context matching value being inaccurate by recursively adding a context matching value of a specific level with a context matching value of a parent level of the specific level.

14. The method of claim 13, wherein the hypercube multi-dimensionally and multi-layeredly representing a kind of context or two or more kinds of contexts associated with each other.

15. The method of claim 13, wherein the context matching value is calculated by multiplying an occurrence frequency of context by a predetermined weight value.

16. The method of claim 15, wherein the predetermined weight value is a level value of the current context.

17. The method of claim 13, wherein the context matching value is based on occurrence frequencies of the user's contexts associated with the domain element and the user's current context.

18. A device comprising: an apparatus of analyzing a user preference about a domain element, comprising:
   a context structure creator executing on a hardware processor, the context structure creator being configured to create a context structure in a form of a hypercube that expresses a relationship between the user's contexts associated with the domain element; and
   a context structure matching unit configured to match a current context of the user to the context structure and to calculate a context matching value of the current context of the user,
   wherein the context matching value represents the user preference about the domain element and the context matching value is calculated in consideration of a frequency of the context matching value being inaccurate by recursively adding a context matching value of a specific level with a context matching value of a parent level of the specific level.

* * * * *